United States Patent [19]

Harvey

[11] E Re. 31,054

[45] Reissued Oct. 12, 1982

[54] DISPLAY PANEL HAVING ROWS AND COLUMNS OF COPLANAR SCAN AND DISPLAY CATHODES AND LARGE-AREA ANODE

[75] Inventor: Edgar L. Harvey, Jamesburg, N.J.

[73] Assignee: Burroughs Corporation, Detroit, Mich.

[21] Appl. No.: 825,361

[22] Filed: Aug. 17, 1977

Related U.S. Patent Documents

Reissue of:

[64] Patent No.: 3,959,681
Issued: May 25, 1976
Appl. No.: 535,891
Filed: Dec. 23, 1974

[51] Int. Cl.[3] ..... H01J 61/067; H01J 6/30; H01J 6/54

[52] U.S. Cl. ..... 313/188; 313/198; 313/217; 313/220

[58] Field of Search ..... 313/217, 220, 198, 188, 313/197

[56] References Cited

U.S. PATENT DOCUMENTS

| | | | |
|---|---|---|---|
| 2,858,480 | 10/1958 | Shadowitz | 315/169 NV X |
| 3,873,870 | 3/1975 | Fukushima et al. | 313/220 X |
| 3,882,349 | 5/1975 | Holz et al. | 313/197 X |
| 3,886,389 | 5/1975 | Ogle | 313/217 X |

*Primary Examiner*—Palmer C. Demeo
*Attorney, Agent, or Firm*—Kevin R. Peterson; Robert A. Green

[57] ABSTRACT

The display panel comprises a gas-filled envelope made up of a base plate and a face plate. The base plate carries a plurality of display cathodes arrayed in rows and columns and, substantially coplanar therewith, a plurality of scan cathodes arrayed in rows and columns, with each row of scan cathodes being positioned between two rows of display cathodes. A single anode is formed on the face plate of the envelope, and suitable masking is provided so that a viewer can see only the display cathodes through the face plate. In operation of the panel, the scan cathodes are energized column-by-column, and selected adjacent display cathodes are energized simultaneously to display a message or character.

21 Claims, 3 Drawing Figures

DISPLAY PANEL HAVING ROWS AND COLUMNS OF COPLANAR SCAN AND DISPLAY CATHODES AND LARGE-AREA ANODE

Matter enclosed in heavy brackets [ ] appears in the original patent but forms no part of this reissue specification; matter printed in italics indicates the additions made by reissue.

BACKGROUND OF THE INVENTION

One type of display panel available commercially is known as a SELF-SCAN panel, and such panels are made up of three insulating plates and three sets of electrodes. Panels of this type operate satisfactorily; however, in recent years, other less complex display panels of the type used in electronic calculators have been developed and include only two insulating plates on which the components of the panel are formed by screen-printing techniques. It would be desirable if such techniques could be used in making the first-mentioned SELF-SCAN panels, and the present invention provides a SELF-SCAN panel construction which can be made by screen-printing techniques.

SUMMARY OF THE INVENTION

Briefly, a display panel embodying the invention includes a row and column array of display cathodes and an interleaved row and column array of scan cathodes, and means for scanning the scan cathodes column-by-column and simultaneously energizing associated display cathodes to display a message or character.

DESCRIPTION OF THE PREFERRED EMBODIMENTS

Figure 1:
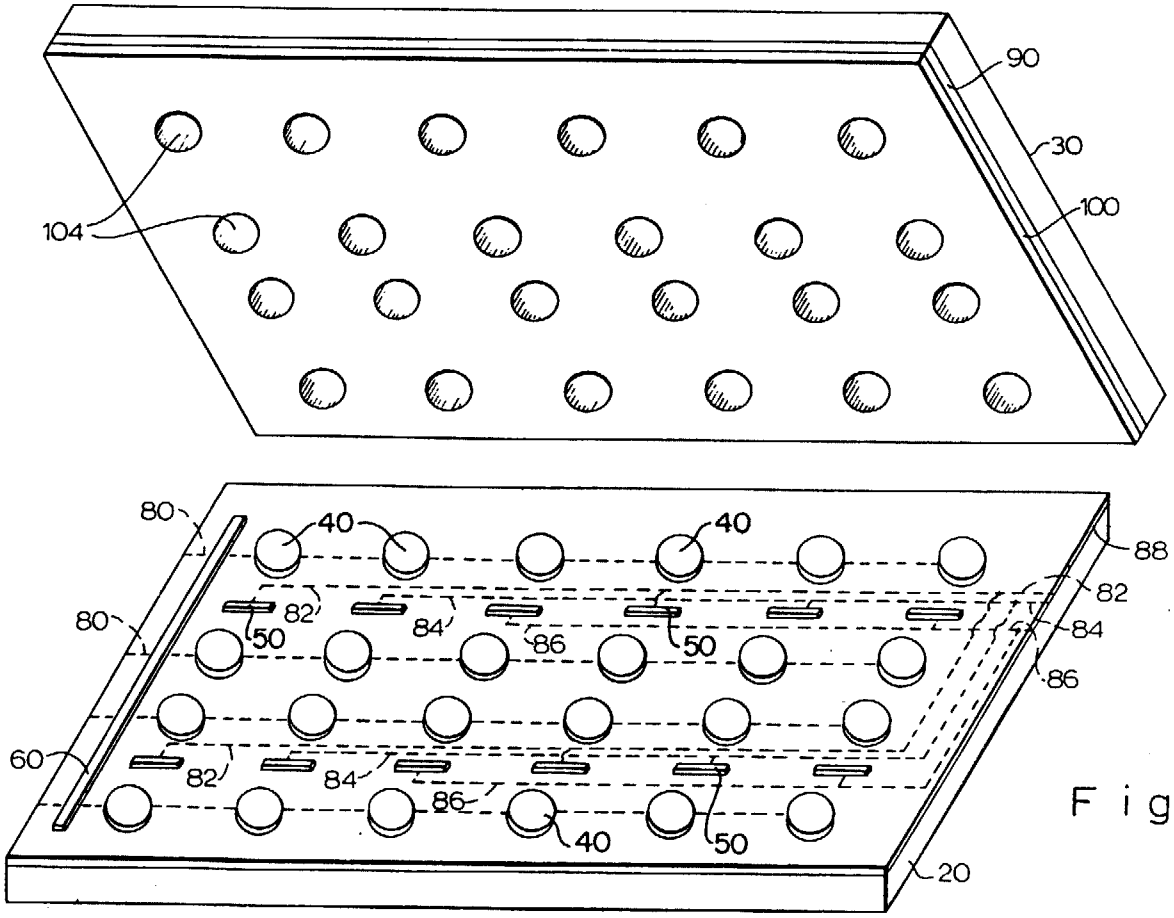
FIG. 1 is a perspective view of a display panel embodying the invention, with its face plate open.
Figure 2:
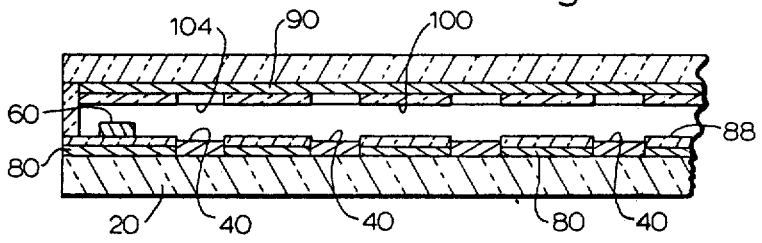
FIG. 2 is a sectional view of the left-hand portion of the panel of FIG. 1.

A display panel 10 embodying the invention comprises an insulating base plate 20, of glass or ceramic, and a glass face plate viewing window 30 which are hermetically sealed together to form a gas-filled envelope. The base plate carries a plurality of first "display" cathodes 40, shown as circles, arrayed in rows and columns, there being a first column adjacent to the left-hand edge of base plate 20 (FIG. 2) and a first row adjacent to the upper edge 1) the base plate. The base plate also carries a plurality of second "scan" cathodes 50 arrayed in rows and columns, there being a row of such second cathodes between each two rows of display cathodes.

It is understood that any desired number of rows and columns of scan and display cathodes may be provided, depending on the number of characters to be displayed and the number of dots of light to be used in making up each character.

An auxiliary reset cathode 60 in the form of a narrow rod is disposed along one edge of the panel, for example, the left-hand edge, suitably insulated from the other electrodes in the panel.

In addition, a keep-alive cell 70 is provided, if desired, adjacent to the reset cathode.

Concerning electrical connections, the display cathodes in each row are connected by a single common conductor 80. The scan cathodes in each row are connected in groups, for example, three groups, as shown by conductors 82, 84, 86, which are suitably insulated from each other, as is well known in the art.

The leads 82 are connected together, and, similarly, the leads 84 and 86 are connected together so that all of the scan cathodes in the first and fourth columns are connected together, all of the scan cathodes in the second and fifth columns are connected together, and all of the scan cathodes in the third and sixth columns are connected together. Thus, only three output leads are needed for all of the scan cathodes.

An insulating layer 88 (shown only in FIG. 2) is provided on the base plate covering all of the conductors 80, 82, 84, 86 but leaving the display and scan cathodes exposed.

The panel anode 90 comprises a thin film of transparent conductive material such as tin oxide on the inner surface of the face plate 30. An opaque mask 100 is screened or otherwise formed on the face plate, and it is provided with apertures 104, each of which overlays a display cathode 40. Thus, the display cathodes are exposed to the anode 90 in the apertures 104 and are also visible to a viewer through the face plate when they glow in operation of the panel. The scan cathodes 50 cannot be seen through opaque mask 100, but each is electrically operable with the anode 90 through an associated aperture 104 therein.

The panel 10 may be made using screen printing techniques for forming all of the electrodes and their conductors except the tin oxide anode 90. Methods of this type are used in PANAPLEX panels which are manufactured by Burroughs Corporation, and they are also described generally in copending U.S. application Ser. No. 173,854, filed Aug. 23, 1971. Those skilled in the art will be able to provide the necessary insulating layers for separating and insulating the various electrode conductors from each other.

In the completed panel 10, the anode 90 is spaced from the display and scan cathodes a distance of the order of 20 mils or less, and the panel includes an ionizable gas such as argon, neon, or the like at a relatively high pressure of about 400 Torr or more. Mercury vapor is usually included in the gas to minimize cathode sputtering. As is well known in the art, the spacing between the anode and cathodes, and the gas pressure are selected to insure that one cathode at a time will fire and that glow can be transferred from cathode-to-cathode as required and in a manner to be described below. It is understood that close spacing and relatively high pressure are required in devices such as panel 10 where an open internal construction is used.

Figure 3:
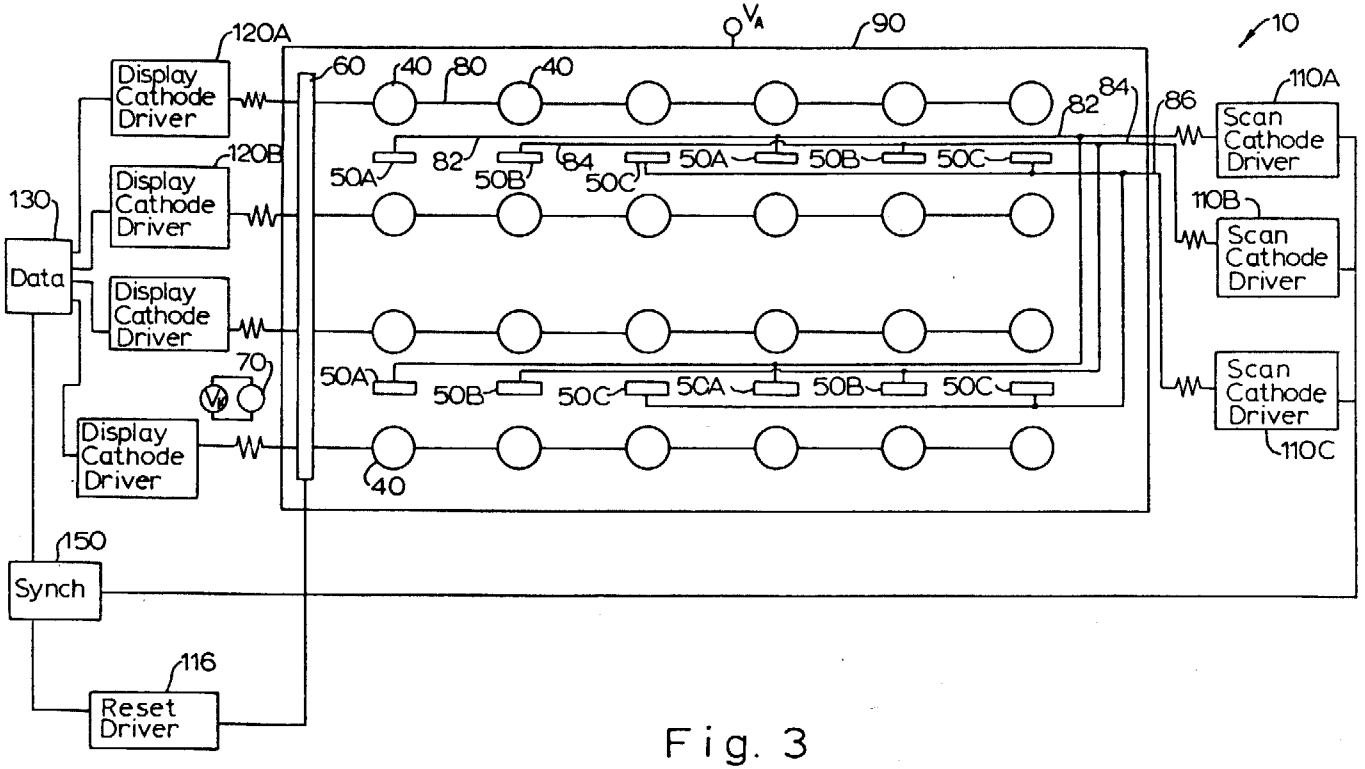
FIG. 3 is a schematic representation of the panel of FIG. 1 and a circuit in which it may be operated.

In operation of the panel 10, referring to FIG. 3, all of the scan cathodes 50A in the first column are connected by their common conductors 82 through suitable resistive paths, if required, to a scan cathode driver 110A. Similarly, the scan cathodes 50B and all of the third scan cathodes 50C are connected to drivers 110B and 110C, respectively. The reset cathode 60 is connected to a reset driver 116, and each of the display cathode conductors 80 and each row of display cathodes is connected to its own display cathode driver 120A, B, C . . . A source of data signals 130, which may include a computer or the like and the usual encoders, decoders, character generators and the like, is connected to the display cathode drivers to supply information signals to be displayed in the panel 10.

A positive power source $V_A$ is connected to the anode 90, and all of the drivers are properly operated by suitable synchronizing circuits represented by block 150. If a keep-alive cell 70 is provided, it is connected to a source of potential $V_K$ which keeps the cell constantly ionized and generating excited particles.

In a typical cycle of operation, with the keep-alive cell 70 ON and power connected to the anode 90, the reset cathode 60 is energized by its driver 116, and it is caused to exhibit cathode glow and to generate excited particles which are available to the first column of scan cathodes 50A. Now, the columns of scan cathodes are energized and ionized sequentially and repeatedly, beginning at the reset cathode and continuing to the right, as seen in FIG. 3. As the columns of scan cathodes are ionized, each generates excited particles. Simultaneously, information signals applied to the cathode drivers 120 from source 130 energize selected display cathodes 40 in the columns of display cathodes. As these selected display cathodes are energized, the excited particles generated by the associated, adjacent scan cathodes assist them in ionizing and exhibiting cathode glow. This operation is repeated for each column of scan cathodes and display cathodes at such a rate that an apparently stationary character or message is displayed by the selected and glowing display cathodes.

What is claimed is:

1. A display panel comprising:

a gas-filled envelope made up of a base plate and a face plate *viewing window* hermetically sealed together and including an array of first display cathode electrodes, adapted for viewing, disposed in rows and columns and including means for energizing all of the display cathodes in each row simultaneously, an array of second scan cathode electrodes, not to be viewed, disposed in rows and columns, with selected first and second cathode electrodes being disposed in operative relation with each other, and means for energizing all of the scan cathode electrodes in each column simultaneously and for energizing the columns of scan cathodes sequentially, said scan cathode electrodes exhibiting scan cathode glow when energized and generating excited particles, the scan cathodes and display cathodes thus being disposed in operative pairs such that, as the columns of scan cathodes are energized, the display cathode associated with each scan cathode can be energized and caused to exhibit cathode glow with the aid of excited particles generated by the associated scan cathode, a single large-area transparent anode electrode disposed on said face plate in operative relation with all of said first and second cathode electrodes, and masking means forming the anode electrode into discrete operative areas, each of which is in operative relation with at least one operative pair of scan and display cathodes.

2. The panel defined in claim 1 wherein said first and second cathode electrodes are substantially coplanar and are supported on said base plate.

3. The panel defined in claim 1 wherein said first and second cathode electrodes are substantially coplanar and are supported on said base plate, and said anode electrode is supported on said face plate.

4. The panel defined in claim 1 wherein said first and second cathode electrodes are substantially coplanar and are supported on said base plate, said anode electrode is supported on said face plate, and masking means in said envelope obstructing everything but said display cathodes from view.

5. The panel defined in claim 1 and including a reset cathode disposed adjacent to the first column of scan cathode.

6. The panel defined in claim 1 wherein said display cathodes and said scan cathodes comprise relatively thin, small-area bodies formed by a screen-printing process.

7. The panel defined in claim 1 wherein said display cathodes are relatively large-area bodies electrically connected in each row with a first line-like conductor, a first insulating coating on each said line-like conductor so that it cannot be seen, said [display] *scan* cathodes comprising smaller bodies which are electrically connected by second line-like conductors, and

[a second] *said* insulating coating *being* on said second line-like conductors.

8. The panel defined in claim 1 wherein said anode electrode is formed on said face plate and said masking means comprises an opaque insulating layer formed on said anode and having rows and columns of apertures, each aperture exposing a portion of the anode electrode, such portion being in operative relation with one of said display and scan cathode electrode pairs.

9. A display panel comprising:

a gas-filled envelope made up of a base plate and a face plate *viewing window* hermetically sealed together and including an array of first display cathode electrodes, adapted for viewing, disposed in rows and columns, a common row conductor connected to all of the display cathodes in each row whereby all of the display cathodes in a row can be energized at the same time, an array of second scan cathode electrodes, not be viewed, disposed in rows and columns, with selected to be and second cathode electrodes being disposed in operative relation with each other, a plurality of row conductors disposed adjacent to each row of scan cathodes with every nth scan cathode being connected to the same row conductor, corresponding row conductors also being connected together by common conductors so that the scan cathodes in each column are electrically connected to the same common conductor whereby operating potential can be applied to each common conductor separately to thereby energize each column of scan cathodes separately and sequentially, the scan cathode electrodes exhibiting scan cathode glow when energized and generating excited particles, the scan cathodes and display cathodes thus being disposed in operative pairs such that, as the columns of scan cathodes are energized, the display cathode associated with each scan cathode can be energized and caused to exhibit cathode glow with the aid of excited particles generated by the associated scan cathode, a single large-area transparent anode electrode disposed on said face plate in operative relation with all of said first and second cathode electrodes, and means forming the anode electrode into discrete operative areas, each of which is in operative relation with at least one operative pair of scan and display cathodes.

*10. A display panel comprising*

*a gas-filled envelope made up of a base plate and a face plate viewing window hermetically sealed together and including*

*an array of first display cathode electrodes, adapted for viewing, disposed in rows and columns and including means for energizing all of the display cathodes in each row simultaneously,*

*an array of second scan cathode electrodes, disposed in rows and columns, with selected first and second cathode electrodes being disposed in operative relation with each other, and means for energizing all of the scan cathode electrodes in each column simultaneously and for energizing the columns of scan cathodes sequentially, said scan cathode electrodes exhibiting scan cathode glow when energized and generating excited particles,*

*the scan cathodes and display cathodes thus being disposed in operative groups such that, as the columns of scan cathodes are energized, the display cathode associated with each scan cathode can be energized and caused to exhibit cathode glow with the aid of excited particles generated by the associated scan cathode, and*

*anode electrode means in operative glow discharge relationship with said scan and display cathode.*

*11. A display panel as in claim 10 wherein said anode electrode means comprises a plurality of anodes, each in operative glow discharge relationship with at least one of said display cathodes and one of said scan cathodes, said anodes being connected electrically in common.*

*12. A gaseous discharge display panel comprising an envelope formed of a face plate, at least portions of which are transparent, and a base plate,*

*said plates being spaced closely to one another and sealed together to form a gas-tight enclosure,*

*an ionizable gas within said enclosure at a pressure capable of sustaining a cathode glow discharge,*

*a plurality of conductive members forming display cathode electrodes arranged in an array of rows and columns on said base plate and in alignment with certain of the transparent portions of the face plate,*

*a plurality of separate conductive members forming scan cathodes arranged in rows and columns on said base plate substantially coplanar with said display cathodes,*

*a first plurality of conductors, each of which connects in common a different plurality of said display cathodes,*

*a second plurality of conductors, each of which connects in common a different plurality of said scan cathodes,*

*said first and second plurality of conductors extending along the surface of the base plate,*

*a layer of insulating material covering said conductors,*

*each scan cathode being in gas communication and glow priming relationship with the corresponding scan cathodes of the next succeeding column and at least one display cathode, so that each scan cathode, when it glows, primes such cathodes,*

*common anode electrode means in operative glow discharge relationship with said scan and display cathodes, and*

*conductor means for energizing said scan cathodes in a scan pattern and synchronously energizing selected groups of said display cathodes.*

*13. A display device as in claim 12 wherein said display and scan cathodes are disposed along the surface of said base plate.*

*14. A display device as in claim 12 wherein*

*each conductor of said first plurality connects electrically in common all of the display cathodes of one of said rows, and*

*each conductor of the second plurality connects electrically in common all of the scan cathodes of one of said columns.*

*15. A display device as in claim 14 wherein said conductor means includes means connected to the conductors of said second plurality for energizing said scan cathodes one column after another in a column scan and means connected to the conductors of said first plurality for successively energizing selected groups of said display cathodes, in synchronism with the column scan, to produce a display pattern in said panel.*

*16. A gaseous discharge display panel comprising*

*an envelope formed of a face plate, at least portions of which are transparent, and a base plate,*

*said plates being spaced closely to one another and sealed together to form a gas-light enclosure,*

*an ionizable gas within said enclosure at a pressure capable of sustaining a cathode flow discharge,*

*a plurality of conductive runs within said enclosure extending along the interior surface of said base plate,*

*a layer of insulating material over said conductive runs,*

*a plurality of glow cathodes disposed along the interior surface of said base plate, each glow cathode being electrically connected to one of said conductive runs,*

*said glow cathodes including display cathodes and scan cathodes disposed in an array of rows and columns,*

*each scan cathode being in gas communication and glow priming relationship with the corresponding scan cathode of the next succeeding column and at least one display cathode, so that each scan cathode, when it glows, primes such cathodes,*

*common anode electrode means in operative glow discharge relationship with said scan and display cathodes, and*

*conductor means for energizing said scan cathodes in a scan pattern and synchronously energizing selected groups of said display cathodes.*

*17. A display device as in claim 16 wherein*

*said conductive runs include a first plurality of row conductors, each of which is connected to all of the display cathodes of a different one of said rows, and*

*a second plurality of conductors, each of which electrically connects in common a different group of said scan cathodes.*

*18. A gaseous discharge display panel comprising a gas-tight envelope including a face plate having a viewing window and a base plate spaced closely to one another and sealed together to form a gas-tight enclosure,*

*an ionizable gas within said envelope at a pressure capable of sustaining a cathode glow discharge,*

*a plurality of display cathode electrodes arranged in an array of rows and columns on said base plate,*

*a plurality of separate scan cathodes arranged in rows and columns on said base plate substantially coplanar with the display cathodes,*

*a first plurality of conductors, each of which connects in common a row of said display cathodes,*

*a second plurality of conductors each of which is connected to a column of said scan cathodes,*

*each scan cathode being in gas communication and glow priming relationship with the corresponding scan cathode of the next succeeding column and at least one display cathode, so that each scan cathode, when it glows, primes such cathodes,*

*anode electrode means in operative glow discharge relationship with said cathodes,* said anode electrode means including a plurality of operative portions, each of which is in operative relationship with one of said display cathodes, said operative portions being connected electrically in common,

*means for energizing the conductors of said second plurality to produce a glow discharge on all of the scan cathodes of each column, one after another, in a column scan, and*

*means for energizing selected groups of the conductors of the second plurality, one such group after another, in synchronism with the column-by-column scan of the scan cathodes, for producing a glow pattern display in said panel.*

*19. A display panel as in claim 18 wherein there is one scan cathode for each two display cathodes, and each scan cathode is in gas communication and priming relationship with such two display cathodes.*

*20. A display panel as in claim 18 wherein said anode electrode means includes a large-area transparent anode between said cathodes and said face plate, and a mask spaced between said transparent anode and cathodes having apertures aligned with at least certain of said cathodes.*

*21. A display panel as in claim 20 wherein the apertures in the mask aligned with the cathodes are aligned only with the display cathodes.*

* * * * *